(12) United States Patent
Mitchell et al.

(10) Patent No.: US 9,157,317 B2
(45) Date of Patent: Oct. 13, 2015

(54) COMBINATION POWER SOURCE FOR A MAGNETIC RANGING SYSTEM

(71) Applicant: Halliburton Energy Services, Inc., Houston, TX (US)

(72) Inventors: Ian Mitchell, Spring, TX (US); Malcolm Upshall, Calgary (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/376,663

(22) PCT Filed: Nov. 29, 2012

(86) PCT No.: PCT/US2012/067036
§ 371 (c)(1),
(2) Date: Aug. 5, 2014

(87) PCT Pub. No.: WO2014/084833
PCT Pub. Date: Jun. 5, 2014

(65) Prior Publication Data
US 2015/0047836 A1 Feb. 19, 2015

(51) Int. Cl.
*E21B 47/022* (2012.01)
*E21B 47/09* (2012.01)
*G01V 3/26* (2006.01)
*E21B 49/00* (2006.01)

(52) U.S. Cl.
CPC ....... *E21B 47/0905* (2013.01); *E21B 47/02216* (2013.01); *E21B 49/00* (2013.01); *G01V 3/26* (2013.01)

(58) Field of Classification Search
CPC . E21B 47/02; E21B 47/022; E21B 47/02216; E21B 47/09; E21B 47/0905; E21B 7/04; E21B 7/10; G01V 3/26

USPC ........................................................ 340/855.8
See application file for complete search history.

(56) References Cited

U.S. PATENT DOCUMENTS 4,372,398 A * 2/1983 Kuckes ........................ 175/45
5,064,006 A 11/1991 Waters et al.
(Continued)

FOREIGN PATENT DOCUMENTS

WO 2009/128989 A1 10/2009
WO 2009/142782 A2 11/2009
WO 2012/067611 A1 5/2012

OTHER PUBLICATIONS

International Search Report and Written Opinion issued in related International Application No. PCT/US2012/067036 mailed Jun. 26, 2013, 12 pages.

*Primary Examiner* — Robert E Fuller
*Assistant Examiner* — David Carroll
(74) *Attorney, Agent, or Firm* — Benjamin Fite; Baker Botts L.L.P.

(57) ABSTRACT

According to aspects of the present disclosure, a magnetic ranging system is described herein. The magnetic ranging system may comprise a downhole apparatus tool (350) that is sized to couple to a drill string (375). The downhole apparatus (350) may be included, for example, near-bit within the bottom assembly (BHA). A transmitter (302) and a receiver (304) may be coupled to the downhole apparatus (350). The system may also comprise a power management system (308) coupled to the downhole apparatus (350). In certain embodiments, the power management system (308) may selectively provide power to the transmitter (302) from a first power source (316) or a second power source (318) based, at least in part, on an estimated distance to a target well.

20 Claims, 4 Drawing Sheets

(56) References Cited

U.S. PATENT DOCUMENTS

| | | |
|---|---|---|
| 5,074,365 A | 12/1991 | Kuckes |
| 5,230,387 A | 7/1993 | Waters et al. |
| 7,321,293 B2 | 1/2008 | Kennedy et al. |
| 7,962,287 B2 | 6/2011 | Clark |
| 2010/0300677 A1 | 12/2010 | Patterson, III et al. |
| 2011/0308859 A1* | 12/2011 | Bittar et al. ............ 175/45 |

* cited by examiner

COMBINATION POWER SOURCE FOR A MAGNETIC RANGING SYSTEM

CROSS-REFERENCE TO RELATED APPLICATION

This application is a U.S. National Stage Application of International Application No. PCT/US2012/067036 filed Nov. 29, 2012, which is hereby incorporated by reference in its entirety.

BACKGROUND

The present disclosure relates generally to well drilling operations and, more particularly, to a combination power source for a magnetic ranging system.

In certain drilling applications it is necessary to intersect an offset or target wellbore with a well that is currently being drilled. Identifying the location of the offset wellbore may require ranging measurements, which may include magnetic ranging. Current ranging systems use either an open-hole wireline sonde or a logging while drilling (LWD) or measuring which drilling (MWD) apparatus. The open-hole wireline sonde typically allows for ranging measurements over a longer distance due through its connection to a surface power source. In contrast, the LWD or MWD apparatus typically includes a downhole battery pack, which provides comparatively little power, and a smaller reach for the ranging measurements. Unfortunately, the use of the open-hole wireline sonde increases the drill time and cost by requiring the drill string be tripped. Moreover, the downhole battery pack typically does not provide sufficient power for longer ranging measurements.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to a combination power source for a magnetic ranging system.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

According to aspects of the present disclosure, a magnetic ranging system is described herein. The magnetic ranging system may comprise a downhole apparatus, such as a ranging tool in a drilling assembly for LWD and MWD operations, that is sized to couple to a drill string. The ranging tool may be included, for example, near-bit within the bottom hole assembly (BHA). A transmitter may be coupled to the ranging tool, and may comprise an electrode that induces an electromagnetic field within a subterranean formation. A receiver may also be coupled to the ranging tool. In certain embodiment, the receiver may comprise a magnetometer that can sense the induced electromagnetic field within the formation. The system may also comprise a power management system coupled to the transmitter. In certain embodiments, the power management system may selectively provide power to the transmitter from a first power source or a second power source based, at least in part, on an estimated distance to a target well. The first power source may comprise, for example, a downhole generator or wireline tool; and the second power source may comprise a battery disposed within the ranging tool.

According to aspects of the present disclosure, a magnetic ranging method is described herein. The method may include introducing a downhole apparatus, including a downhole LWD/MWD apparatus such as a ranging tool, into a borehole. The ranging tool may be coupled to a drill string and be positioned near-bit in a BHA. The method may also include selectively providing power to a transmitter disposed in the ranging tool from a first power source or a second power source based, at least in part, on an estimated distance to a target well. As will be described below, selectively providing power to the transmitter to the first power source or the second power source based, at least in part, on an estimated distance to a target well may comprise switching between the first power source and the second power source according to at least one operational parameter of the first power source or the second power source. The first power source may comprise, for example, a downhole generator or wireline tool; and the second power source may comprise a battery disposed within the ranging tool. The method may also include inducing with the transmitter an electromagnetic field into a formation surrounding the borehole, and receiving at the ranging tool the induced electromagnetic field.

Figure 1:
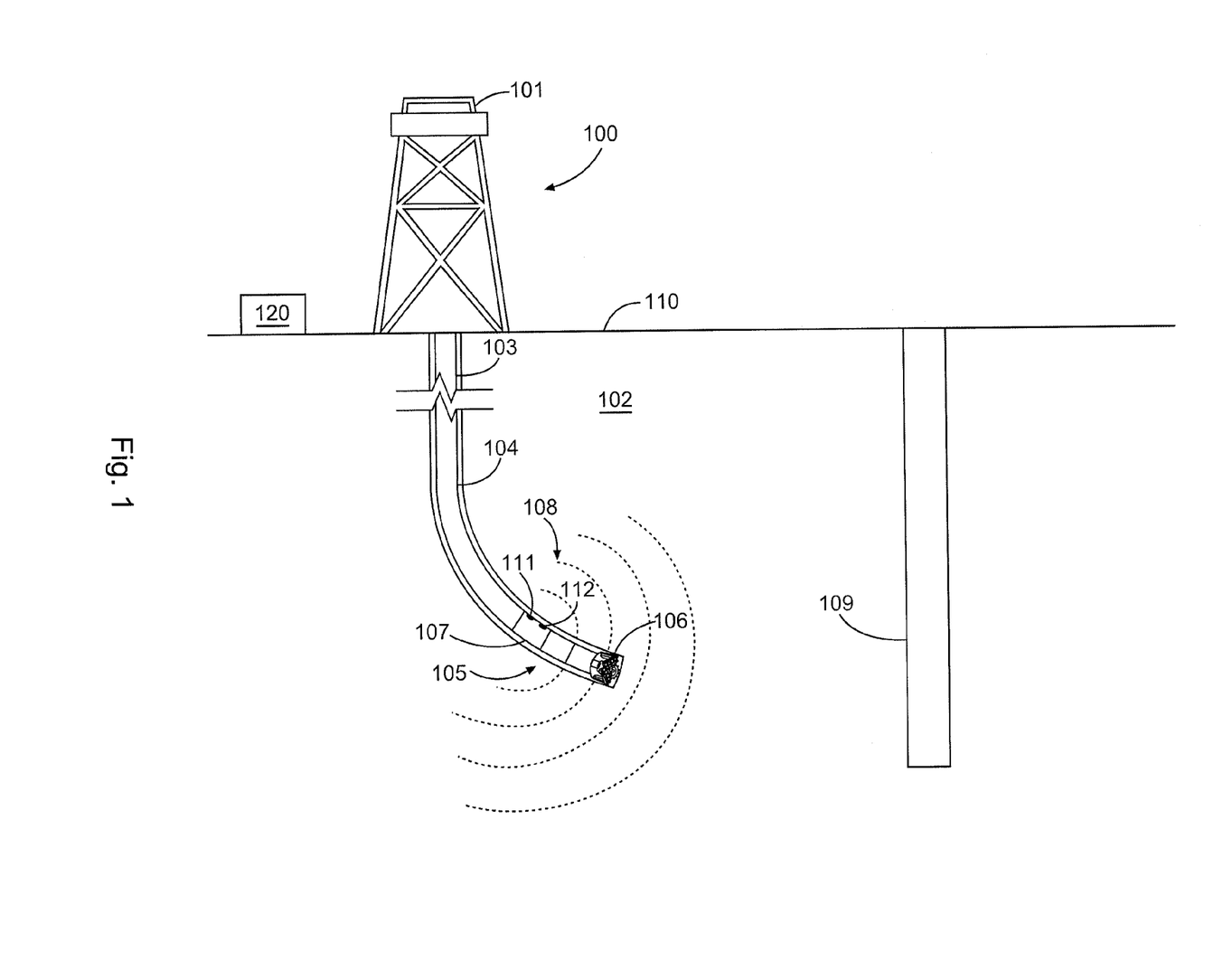
FIG. 1 illustrates an example magnetic ranging system, according to aspects of the present disclosure.

FIG. 1 shows an example magnetic ranging system 100, according to aspects of the present disclosure. The ranging system 100 includes a rig 101 mounted at the surface 110, positioned above a borehole 103 within a subterranean formation 102. The rig 101 may drive a drill string 104 that comprises a plurality of drill pipe segments and a BHA 105. The BHA may comprise multiple MWD and LWD apparatuses coupled on one side to the drill pipe and on another side to the drill bit 106. One example LWD/MWD apparatus may comprise a ranging tool 107. The ranging tool 107 may include a transmitter 111 that induces an electromagnetic field 108 into the formation 102. In certain embodiments, the transmitter 111 may comprise an electrode that induces the electromagnetic field by current injection. The induced electromagnetic field may be sensed by a receiver 112 such as a magnetometer. The receiver 112 may communicate with a control unit 120 positioned at the surface 110. In certain embodiment, the receiver 112 may communicate with the control unit 120 through a telemetry system, and may transmit data regarding the induced magnetic field to the control unit 120 for processing.

As will be appreciated by one of ordinary skill in the art, the ranging system 100 may be used to identify the location of target well 109. In certain instances, the position of the target well 109 may need to be determined so that the well being drilled by rig 101 may intersect the target well 109. The strength on the magnetic field, and the distance it penetrates into the formation 102, may depend on the strength of the power source available to the ranging tool 107. For example, if an electrode is used, the strength of the electromagnetic field may depend on the strength of the current injected into the formation, which in turn may depend on the power level available to generate current. Depending on the distance to the target well 109, certain power sources may not be strong enough to induce electromagnetic fields that reach the target well. For example, a battery in ranging tool 107 may provide enough power when the drill bit is close to the target well 109, but may not provide enough to identify the location of the target well 109 from far away. Open-hole wire sondes connected to a surface power source can be used for longer ranging measurements, but they require that the drill string be tripped out of the borehole, increasing the cost and time of drilling.

Figure 2:
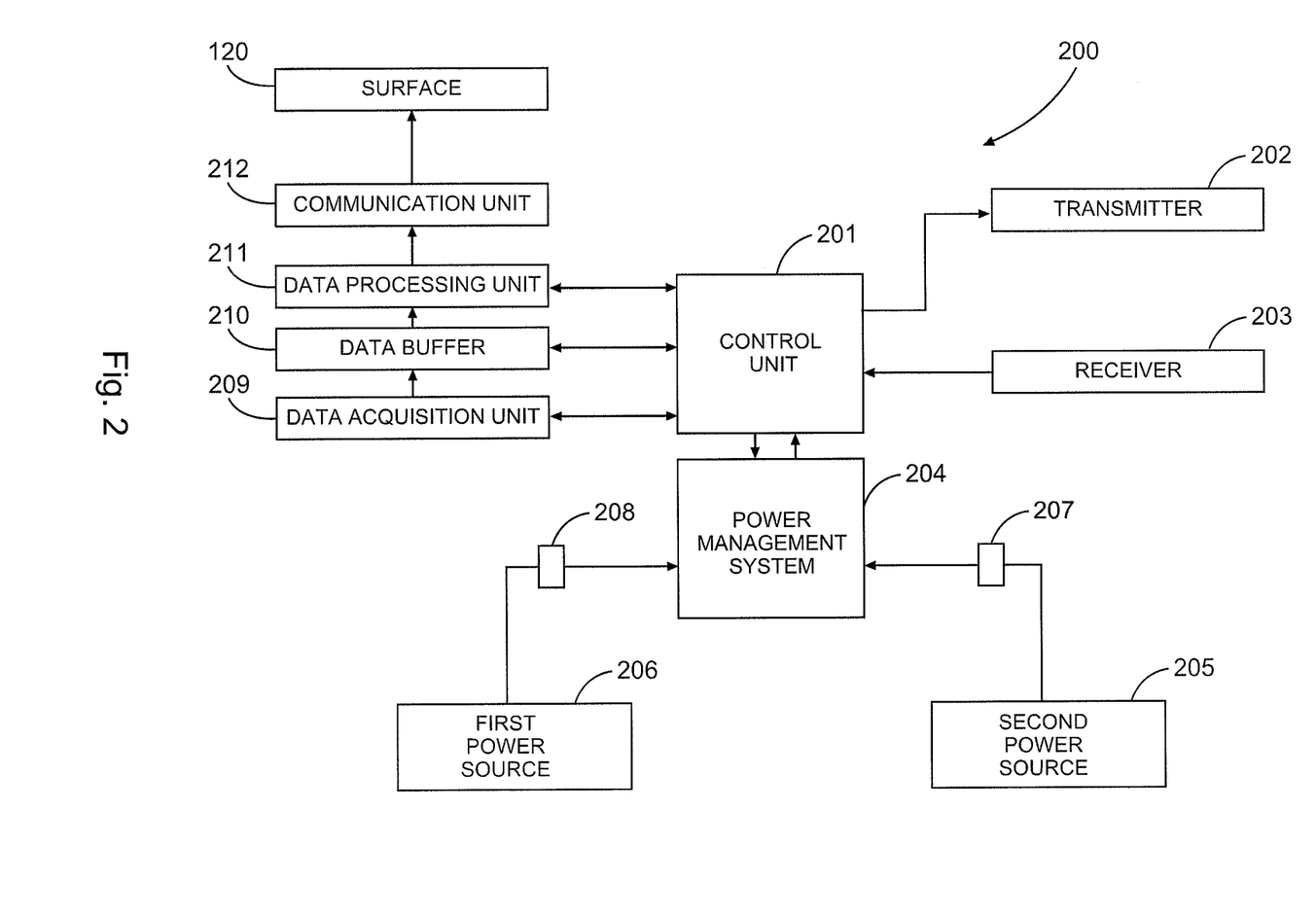
FIG. 2 illustrates a functional diagram of an example magnetic ranging system, according to aspects of the present disclosure.

FIG. 2 illustrates a functional diagram of an example magnetic ranging system 200, according to aspects of the present disclosure. The magnetic ranging system 200 may comprise a control unit 201 and a power management system 204. The control unit 201 and the power management system 204 may comprise various processors or other control mechanisms that would be appreciated by one of ordinary skill in the art in view of this disclosure. In certain embodiments, the control unit 201 and the power management system 204 may communicate bi-directionally over wires or a bus. In other embodiments, the control unit 201 and the power management system 204 may be integrated into the same control mechanism.

The control unit 201 may be coupled to a transmitter 202 and a receiver 203. In certain embodiments, the transmitter 202 may comprise an electrode that injects current into a formation when triggered by the control unit 201. The power management system 204 may be coupled to a first power source 206 and a second power source 205 through first power interface 208 and second power interface 207, respectively. The first power interface 208 and second power interface 207 may take a variety of forms, as will be explained below. The power management system 204 may selectively provide power to the transmitter 202 from either the first power source 206 or the second power source 205. For example, the power management system 204 may include internal mechanical and/or electrical switching mechanisms that select which of the first power source 206 and second power source 205 from which to draw power. The power may then be provided to the transmitter 202 through the control unit 201.

In certain embodiments, each of the first power source 206 and the second power source 205 may be characterized as having separate operational parameters. The operational parameters may include the maximum power available and the duration for which the power is available. The maximum power available may limit the depth with which the ranging measurements can be taken. For example, if the first power source 206 has a higher maximum power, it may allow for a greater depth of ranging measurements when compared to the second power source 205. The power management system 204 may account for the operational parameters and selectively provide power to the transmitter 202 based at least in part on an estimated distance to a target well, and the capability of the selected power source to generate a sufficient electromagnetic field to reach the target well. In certain embodiments, the power management system 204 may switch between the first power source 206 and the second power source 205. For example, as a well is being drilled to intersect a target well, a stronger power source may be used initially to perform ranging measurements, but as the drill bit nears the target well, the power management system may switch to the other weaker power source, as the stronger power source is no longer necessary to perform the required ranging measurements.

As described above, the location of a target will may be identified using a downhole MWD/LWD apparatus, such as ranging tool 200. The data acquisition unit 209 may control reception of signals from the receivers 203. The signals may indicate the electromagnetic field and fluctuations in the field caused by the target well. The data acquisition unit 209 may cause the received signals to be stored in data buffer 210 until a complete set of signals is received at the control unit 201. Once the complete set of the signals is stored in the data buffer 210, the data processing unit 211 may either process the signals to determine the location of the target well, or process the received signals for transmission to a surface control unit 120 through communication unit 212. In certain embodiments, the communication unit 212 may comprise a telemetry system.

Figure 3:
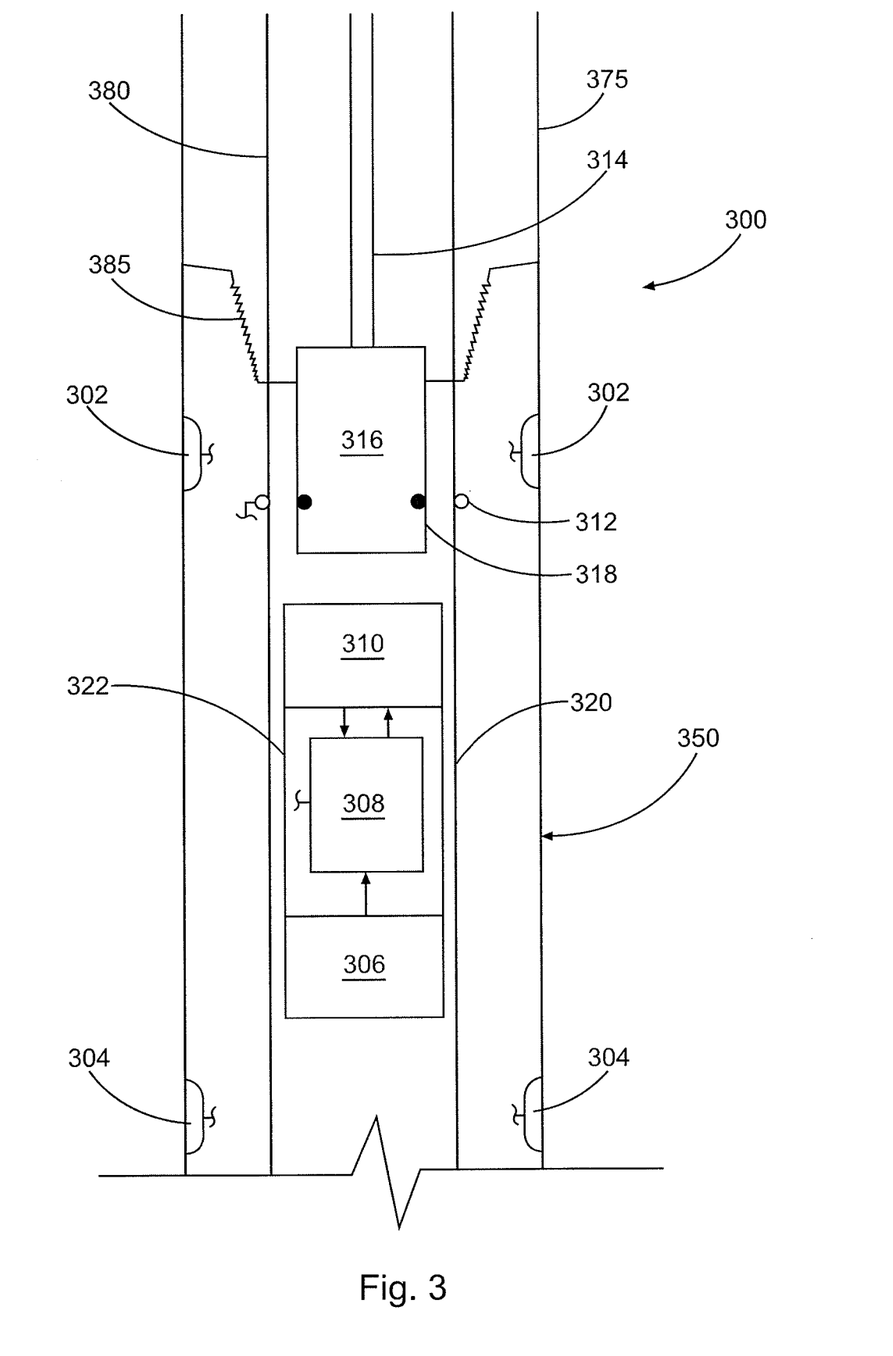
FIG. 3 illustrates an example magnetic ranging system, according to aspects of the present disclosure.

FIG. 3 illustrates an example magnetic ranging system 300, according to aspects of the present disclosure. The ranging system comprises a downhole apparatus for use in MWD/LWD configurations, ranging tool 350, sized to couple to a drill string. In the embodiment shown, the ranging tool 350 may be coupled to a drill pipe segment 375 through threads 385. The drill pipe segment 375 and ranging tool 350, when coupled together, may define a substantially constant inner bore 380. During drilling operations, mud may be pumped downhole through the internal bole 380, exit through the drill bit (not shown) and circulate back to the surface. The raging tool 350 may comprise elements disposed within the bore 380, including control unit 310, power management system 308, and second power source 306. These elements may integrally connected with the ranging tool 350, and sealed from exposure to the mud flow, but still allow mud flow through the ranging tool via ports 322 and 320.

In certain embodiments, the ranging tool 350 may comprise transmitters 302 and receivers 304. The transmitters 302 may be azimuthally spaced and may induce an electromagnetic field into a formation surrounding the ranging tool 350. In certain embodiments, the transmitters 302 may comprise azimuthally spaced electrodes that inject current into the formation to induce the electromagnetic field. The ranging tool 350 may further comprise receivers 304 in form of magnetometers, antennae, or other electromagnetic field sensing mechanisms. The transmitters 302 and receivers 304 may be coupled to control unit 310, which may trigger the transmitters 302 to induce an electromagnetic field into a formation, and may receive measurements from the receivers 304 reflecting the induced electromagnetic field.

The magnetic ranging system 300 may further comprise a first power source and a second power source. In the embodiment shown, the first power source comprises a wireline tool 316 disposed within an internal bore 380 of the drill string, connected to and receiving power from the surface via wireline 314. The ranging tool 350 may comprise a first power interface 312 associated with the first power source 316. In the embodiment shown, the first power interface comprises a wired coil 312 disposed on an inner surface on the ranging tool 350, and coupled to the power management system 308. The wireline tool 316 may comprise a second power interface 318 disposed therein. In the embodiment shown, the second power interface comprises a second wired coil 318. The first wired coil 312 and the second wired coil 318 may form an inductive coupling, which permits the transferrence of power from the wireline tool 316 to the ranging tool 350. In particular, the inductive coupling may be formed when the first power source 316 is placed proximate to the first power interface. As will be appreciated by one of ordinary skill in the art in view of this disclosure, other power source/wireline tool configurations and power interfaces are possible within the scope of this disclosure. For example, instead of connecting to the power management system 308 through the wired coil 312, a wireline tool may be coupled to the power management system 308 through a "wet" connection, where a seal protecting the electrical components from the mud flow is broken so that the power management system 308 may be directly connected to a surface power system via a wireline and an power interface integrated in the power management system 308 or control unit 310.

The magnetic ranging system 300 may further include a second power source 306. In particular, the second power source 306 comprises a battery disposed within the ranging tool 350 and coupled to the power management system 308. In operation, the power management system 308 may selectively provide power to the transmitters 302 from either the first power source 316 or the second power source 306 based, at least in part, on an estimated distance to a target well. In certain embodiments, the power management system 308 may further account for at least one operational parameter of the first power source or second power source. For example, the power management system may comprise a downhole processor with memory that receives instructions from the surface and accounts for the strength of the power sources and the estimated distance to the target when selectively providing power from the first power source or second power source to the transmitter. For long distance ranging measurements, the power source with the higher capacity may be selected to so that the induced electromagnetic field may reach the target well. Likewise, for close ranging measurements, the lower capacity power source may be selected to provide power to the transmitter to preserve power.

Figure 4:
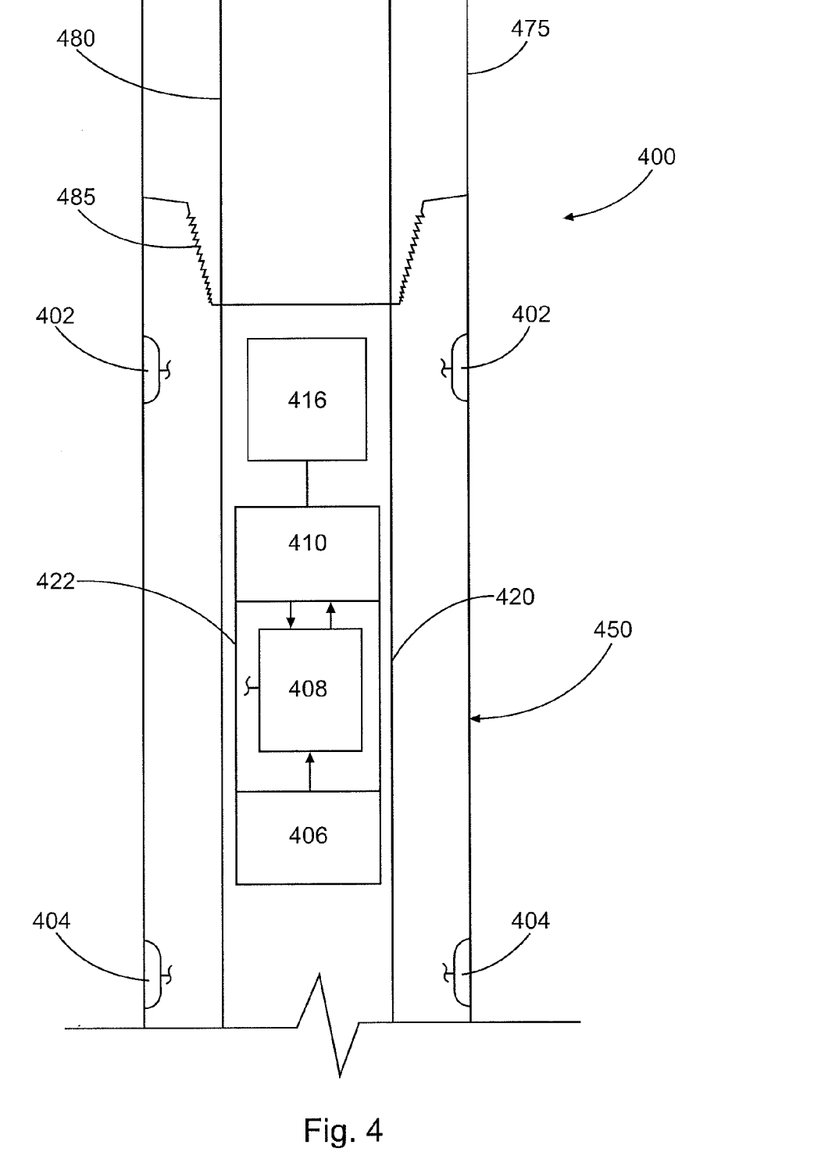
FIG. 4 illustrates an example magnetic ranging system, according to aspects of the present disclosure.

FIG. 4 illustrates an example magnetic ranging system 400, according to aspects of the present disclosure. The ranging system comprises a ranging tool 450 sized to couple to a drill string. In the embodiment shown, the ranging tool 450 may be coupled to a drill pipe segment 475 through threads 485. The drill pipe segment 475 and ranging tool 450, when coupled together, may define a substantially constant inner bore 480. During drilling operations, mud may be pumped downhole through the internal bore 480, exit through the drill bit (not shown) and circulate back to the surface. The raging tool 450 may comprise elements disposed within the bore, including control unit 410, power management system 408, and second power source 406. These elements may integrally connected with the ranging tool 450, but still allow mud flow through the ranging tool via ports 422 and 420.

In certain embodiments, the ranging tool 450 may comprise transmitters 402 and receivers 404. The transmitters 402 may be azimuthally spaced and may induce an electromagnetic field into a formation surrounding the ranging tool 450. In certain embodiments, the transmitters 402 may comprise azimuthally placed electrodes that inject current into the formation to induce the electromagnetic field. The ranging tool 450 may further comprise receivers 404 in form of magnetometers, antennae, or other electromagnetic field sensing mechanisms. The transmitters 402 and receivers 404 may be coupled to control unit 410, which may trigger the transmitters 402 to induce an electromagnetic field into a formation, and may receive measurements from the receivers 404 reflecting the induced electromagnetic field.

The magnetic ranging system 400 may further comprise a first power source and a second power source. In the embodiment shown, the first power source may comprise a downhole generator 416 disposed within an internal bore 480 of the drill string, and coupled to the power management system 408. In certain embodiments, the downhole generator 416 may comprise a mud flow motor that generates electricity in response to mud flow within the internal bore 480. The magnetic ranging system 400 may further include a second power source 406. In particular, the second power source 406 may comprise a battery disposed within the ranging tool 406 and coupled to the power management system 408. In operation, the power management system 408 may selectively provide power to the transmitters 402 from either the first power source 416 or the second power source 406 based, at least in part, on an estimated distance to a target well. In certain embodiments, the power management system 408 may further account for at least one operational parameter of the first power source or second power source. For example, the power management system may comprise a downhole processor with memory that receives instructions from the surface and accounts for the strength of the power sources and the estimated distance to the target when selectively providing power from the first power source or second power source to the transmitter. For long distance ranging measurements, the power source with the higher capacity may be selected to so that the induced electromagnetic field may reach the target well. Likewise, for close ranging measurements, the lower capacity power source may be selected to provide power to the transmitter to preserve power.

According to aspects of the present disclosure, a magnetic ranging method is also described herein. The method may include introducing a downhole apparatus, such as a ranging tool, into a borehole, wherein the ranging tool is coupled to a drill string. The ranging tool may have a similar configuration to the ranging tools described above. The method may further include selectively providing power to a transmitter disposed in the ranging tool from a first power source or a second power source based, at least in part, on an estimated distance to a target well. In certain embodiments, the first power source may comprise at least one of a mud flow generator disposed within the ranging tool and a wireline tool disposed within an internal bore of the drill string, and the second power source may comprise at least one battery disposed within the ranging tool.

In certain embodiments, the ranging tool may comprise a first power interface associated with the first power source.

For example, the first power interface may comprise a first wired coil. In certain embodiments, the method may include introducing the first power source into an internal bore of the drill string. The first power source may comprise a wireline sonde with a second wired coil. The first power source may be positioned proximate to the ranging tool, with the first wired coil and the second wired coil form an inductive coupling.

As described above, selectively providing power to the transmitter from the first power source or the second power source based, at least in part, on an estimated distance to a target well may comprise switching between the first power source and the second power source according to at least one operational parameter of the first power source or the second power source. This may allow for the ranging system to accurately locate a target well from a variety of distances without having to trip out the drill string.

In certain embodiments, the method further comprises inducing with the transmitter an electromagnetic field into a formation surrounding the borehole, and receiving at the ranging tool the induced electromagnetic field. Each time a measurement is taken, the ranging tool may transmit the measurements to a surface control unit, which may update an estimated location of the target well. Future ranging measurements may take this updated location into account. For example, the power management system may selectively switch between the first power source and the second power source depending on the updated estimated location of the target well.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A magnetic ranging system, comprising:
   a downhole apparatus sized to couple to a drill string;
   a transmitter coupled to the downhole apparatus;
   a receiver coupled to the downhole apparatus; and
   a power management system coupled to the downhole apparatus, wherein the power management system selectively provides power to the transmitter from a first power source or a second power source based, at least in part, on an estimated distance to a target well.

2. The magnetic ranging system of claim 1, wherein the first power source comprises at least one of a mud flow generator disposed within the downhole apparatus and a wireline tool disposed within an internal bore of the drill string.

3. The magnetic ranging system of claim 2, wherein the second power source comprises at least one battery disposed within the downhole apparatus.

4. The magnetic ranging system of claim 1, wherein the downhole apparatus comprises a first power interface associated with the first power source and coupled to the power management system.

5. The magnetic ranging system of claim 4, wherein the first power interface comprises a first wired coil.

6. The magnetic ranging system of claim 5, wherein:
   the first power source comprises a wireline sonde disposed within an internal bore of the drill string; and
   the first power source comprises a second wired coil disposed on the wireline sonde that forms an inductive coupling with the first wired coil.

7. The magnetic ranging system of claim 1, wherein selectively providing power to the transmitter from the first power source or the second power source based, at least in part, on an estimated distance to a target well comprises switching between the first power source and the second power source according to at least one operational parameter of the first power source or the second power source.

8. A magnetic ranging method, comprising:
   introducing a downhole apparatus into a borehole, wherein the downhole apparatus is coupled to a drill string;
   selectively providing power to a transmitter disposed in the downhole apparatus from a first power source or a second power source based, at least in part, on an estimated distance to a target well;
   inducing with the transmitter an electromagnetic field into a formation surrounding the borehole; and
   receiving at the downhole apparatus the induced electromagnetic field.

9. The magnetic ranging method of claim 8, wherein the first power source comprises at least one of a mud flow generator disposed within the downhole apparatus and a wireline tool disposed within an internal bore of the drill string.

10. The magnetic ranging method of claim 9, wherein the second power source comprises at least one battery disposed within the downhole apparatus.

11. The magnetic ranging method of claim 8, wherein the downhole apparatus comprises a first power interface associated with the first power source.

12. The magnetic ranging method of claim 11, wherein the first power interface comprises a first wired coil.

13. The magnetic ranging method of claim 12, further comprising:
   introducing the first power source into an internal bore of the drill string, wherein the first power source comprises a wireline sonde with a second wired coil; and
   positioning the first power source proximate to the downhole apparatus, wherein the first wired coil and the second wired coil form an inductive coupling.

14. The magnetic ranging method of claim 8, wherein selectively providing power to the transmitter from the first power source or the second power source based, at least in part, on an estimated distance to a target well comprises switching between the first power source and the second power source according to at least one operational parameter of the first power source or the second power source.

15. A magnetic ranging system, comprising:
   a downhole apparatus sized to couple to a drill string;
   a transmitter coupled to the downhole apparatus;
   a first power source coupled to a power management system disposed in the downhole apparatus;
   a second power source disposed within the downhole apparatus and coupled to the power management system; and
   the power management system, wherein the power management system:
   is coupled to the transmitter; and
   selectively provides power to the transmitter from the first power source or the second power source based, at least in part, on an estimated distance to a target well.

16. The magnetic ranging system of claim 15, wherein the first power source comprises at least one of a mud flow generator disposed within the downhole apparatus and a wireline tool disposed within an internal bore of the drill string.

17. The fracture sensing system of claim 15, wherein the first power source is coupled to the power management system through a first power interface disposed within the downhole apparatus.

18. The magnetic ranging system of claim 16, wherein:
   the first power source comprises a wireline tool disposed within an internal bore of the drill string;
   a first coiled wire is disposed within the first power source;
   the first power interface comprises a second coiled wire; and
   the first coiled wire and the second coiled wire form an inductive coupling.

19. The magnetic ranging system of claim 16, wherein the second power source comprises at least one battery disposed within the downhole apparatus.

20. The magnetic ranging system of claim 15, wherein selectively providing power to the transmitter from the first power source or the second power source based, at least in part, on an estimated distance to a target well comprises switching between the first power source and the second power source according to at least one operational parameter of the first power source or the second power source.

* * * * *